(No Model.)
P. KENNEDY & C. J. DISS.
STORAGE BATTERY.
No. 482,044. Patented Sept. 6, 1892.
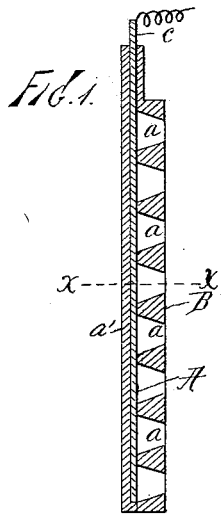
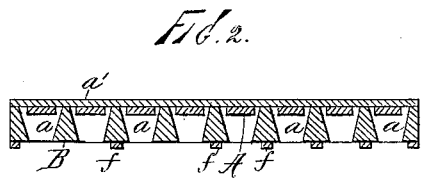
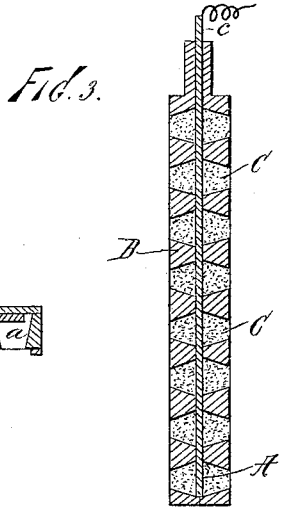
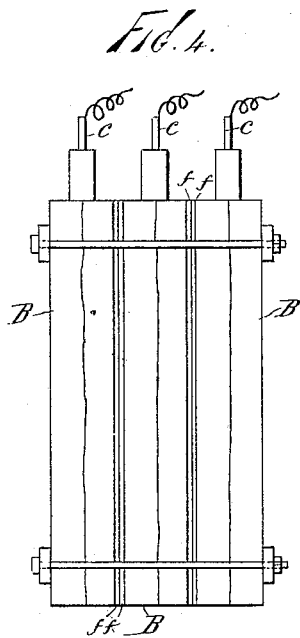
Witnesses
John Buckler,
O. J. Morgan
Inventors
Patrick Kennedy
Charles J. Diss
By their Attorney
James A. Whitney

UNITED STATES PATENT OFFICE.

PATRICK KENNEDY AND CHARLES J. DISS, OF BROOKLYN, NEW YORK, ASSIGNORS TO THE ACME STORAGE BATTERY COMPANY, OF WEST VIRGINIA.

STORAGE-BATTERY.

SPECIFICATION forming part of Letters Patent No. 482,044, dated September 6, 1892.

Application filed September 25, 1891. Serial No. 406,803. (No model.)

*To all whom it may concern:*

Be it known that we, PATRICK KENNEDY and CHARLES J. DISS, citizens of the United States, residing at Brooklyn, in the county of Kings and State of New York, have invented certain new and useful Improvements in Storage-Batteries, of which the following is a specification.

Our invention relates to a storage-battery in which the electrical conductivity necessary to the operation of the apparatus is provided by a conductor distinct from the structure or structures which support the active material, the latter being supported by a structure or structures composed of a material or materials which are practically non-conductors of electricity.

The drawings illustrate apparatuses of this kind in which our present invention may be employed.

Figure 1 is a transverse sectional view of such an apparatus, and Fig. 2 a transverse sectional view taken on the line $x\ x$ of Fig. 1 and also on the corresponding line of Fig. 3, the latter representing an apparatus of somewhat different construction, but operating upon the same principle as that shown in Fig. 1. Fig. 4 shows a number of such apparatuses as placed and arranged in a cell of a storage-battery.

In the drawings, A is a conductor of electricity disposed as a slotted plate in contact with the side or sides of a structure B, which is provided with cavities $a$, in which the active material is placed and which is formed of a material which to all practical intents and purposes is not a conductor of electricity. In Fig. 1 but one such structure is used, the opposite side of the conductor being covered by a protecting-plate $a''$ also made of a non-conducting material. In Fig. 3 two such structures are used, one on each side of the conductor A. The active material C is placed in the cavities or openings of the structure or structures B and in contact with the conductor A.

In the cell of a storage-battery any desired number of apparatus made as described are placed and secured side by side and provided with connecting conducting-wires corresponding to those which connect the leaden plates of the ordinary storage-battery.

As the various combinations of parts embraced in the mechanical structure represented in the figures aforesaid are shown and described as the subject-matter of a certain other application for Letters Patent filed by us on the 25th day of September, 1891, Serial No. 406,802, we do not claim said structures in this our present specification.

The object of our present invention is to provide a non-conducting structure for supporting the active material which will be light, strong, durable, inexpensive, easily manufactured, non-conductive in a high degree of electricity, not liable to warp out of shape, and generally efficient for the purposes for which it is intended.

In the practice of our invention we take a suitable bituminous, resinous, gummy, or gum-resinous material, which is capable of being brought to a plastic condition, capable in that condition of being mingled with powdered, granular, or fibrous mineral substances, and capable thereafter of hardening or solidifying to bind the particles, grains, or fibers of such substance together, and which in its hardened or solidified condition is a non-conductor of electricity. In the production of our said invention we first bring in any suitable manner the said material to a plastic condition and combine or incorporate the same with a mineral non-conductor of electricity in a powdered, granular, or fibrous condition in such manner that the particles, fibers, or granules of the mineral are united by the other material in its plastic state and on hardening or solidification of the plastic material provide a solid substance. The material which in the production of the compound is used in a plastic condition we term for convenience "the originally-plastic non-conductor of electricity," because it is in a plastic condition when originally mingled or incorporated with the powdered, granular, comminuted, or fibrous substance or substances, and because when such incorporation is completed and the material takes its final and operative place in the product it is itself a non-conductor of electricity. Said original plastic material may consist of bitumen, which hardens to a solid condition at ordinary temperatures, or it may be a cohesive resin or a gum-resin or any like material, provided it be capable of withstanding to a greater or less extent the solvent or corrosive action of the liquid in the battery-cell. The mineral material may be silica, asbestus, or any other having to a substantial or relative degree the property of resisting the passage of electrical currents—in other words, a non-conductor of electricity—and of a character capable of admixture and incorporation with what we herein term "the cohesive or originally-plastic non-conductor." The better results are obtained when the mineral is finely comminuted, the more finely the better, as a more coherent, stronger, and uniformly non-conducting compound is by this means obtained. The best results are secured when shellac is employed as the originally-plastic material and glass reduced to a substantially floured or minutely-powdered state is employed as the mineral component of the product. The best proportions are, say, one part, by weight, of shellac and five parts, by weight, of the floured or minutely-powdered glass. Substantially the same proportions may be used when other cohesive or originally-plastic material and other mineral material are employed; but the proportions may be widely departed from without going beyond the scope and character of our said invention.

The materials may be combined or incorporated in any suitable manner or by any suitable means. The structure may be formed therefrom by casting in molds when the combined materials are in a plastic condition or from the compound in its solid condition by the use of suitable tools, the former being in general the method to be preferred. We do not confine ourselves to any particular form of structure for holding the active material of a storage-battery, the mere form itself being immaterial to our present invention.

It will be observed that the originally-plastic material, being incorporated with the mineral material in a powdered, granular, comminuted, or fibrous state, cements the particles, granules, or fibers, as the case may be, firmly together, and on the hardening to a solid state of the compound the cohesion of the originally-plastic material affords a permanent bond of union between the particles, granules, fibers, &c., of the mineral component of the compound.

What we claim as our invention is—

1. A structure for holding the active material of a storage-battery, composed of a cohesive bitumen, resin, gum, or gum-resin and a mineral non-conductor of electricity, substantially as herein set forth.

2. A structure for holding the active material of a storage-battery, composed of a cohesive bitumen, resin, gum, or gum-resin and a mineral non-conductor of electricity, in substantially the proportions herein set forth.

3. A structure for holding the active material of a storage-battery, composed of a cohesive bitumen, resin, gum, or gum-resin and a finely-pulverized mineral non-conductor of electricity, substantially as herein set forth.

4. A structure for holding the active material of a storage-battery, composed of shellac and a mineral non-conductor of electricity, substantially as herein set forth.

5. A structure for holding the active material of a storage-battery, composed of shellac and a finely-pulverized mineral non-conductor of electricity, substantially as herein set forth.

6. A structure for holding the active material of a storage-battery, composed of shellac and a finely-pulverized mineral non-conductor of electricity, in substantially the proportions herein set forth.

7. A structure for holding the active material of a storage-battery, composed of shellac and finely-pulverized glass, substantially as herein set forth.

8. A structure for holding the active material of a storage-battery, composed of shellac and finely-pulverized glass, in substantially the proportions herein set forth.

9. A structure for holding the active material of a storage-battery, composed of a cohesive bitumen, resin, gum, or gum-resin and a floured mineral non-conductor of electricity, substantially as herein set forth.

10. A structure for holding the active material of a storage-battery, composed of a cohesive bitumen, resin, gum, or gum-resin and floured glass, substantially as herein set forth.

11. A structure for holding the active material of a storage-battery, composed of shellac and floured glass, substantially as herein set forth.

PATRICK KENNEDY.
CHARLES J. DISS.

Witnesses:
WILLIAM I. BARKER,
H. CLAY TRUMPER.